United States Patent [19]
Yang

[11] Patent Number: 5,620,244
[45] Date of Patent: Apr. 15, 1997

[54] COMPUTER ACCESSORY ENGAGEMENT/DISENGAGEMENT MECHANISM

[75] Inventor: Yung-Chi Yang, Taipei, Taiwan

[73] Assignee: Inventec Corporation, Taiwan

[21] Appl. No.: 531,972

[22] Filed: Sep. 21, 1995

[51] Int. Cl.$^6$ .................................................. A47B 88/00
[52] U.S. Cl. ......................... 312/333; 312/9.22; 292/219
[58] Field of Search ............................... 312/333, 223.2, 312/215, 222, 9.17, 9.19, 9.22; 292/121, 219

[56] References Cited

U.S. PATENT DOCUMENTS

| | | | |
|---|---|---|---|
| 4,159,153 | 6/1979 | Yoshikawa | 312/333 |
| 5,303,993 | 4/1994 | Stephan et al. | 312/9.22 |
| 5,344,226 | 9/1994 | Lee | 312/333 X |
| 5,388,901 | 2/1995 | Asano | 292/219 X |

*Primary Examiner*—Peter M. Cuomo
*Assistant Examiner*—James O. Hansen
*Attorney, Agent, or Firm*—Shoemaker and Mattare, Ltd.

[57] ABSTRACT

An accessory is retained in a computer by a latching mechanism having a sliding disengaging member which, when actuated, not only releases the accessory from a latching arm, but also pushes the accessory partially out of the computer housing.

3 Claims, 7 Drawing Sheets

COMPUTER ACCESSORY ENGAGEMENT/DISENGAGEMENT MECHANISM

BACKGROUND OF THE INVENTION

1. Field of the Invention

The present invention relates to computers, and more particularly, to a notebook computer accessory engagement/disengagement mechanism.

2. Description of Prior Art

Notebook computers usually come with built-in optional accessories, such as batteries, CD-ROMs, hard disk drives or floppy disk drives, provided therein. The engagement means for the accessory to the notebook computer is usually a hook latch.

A drawback of using a hook as the sole means for engagement is that it usually needs one hand to pull the accessory out of the computer while the other releasing the hook for the purpose of disengagement. Thus, there exists a need for a more user-friendly engagement/disengagement mechanism that makes it easier for the user to disengage the accessory from the computer.

SUMMARY OF THE INVENTION

It is therefore a primary objective of the present invention to provide a computer accessory engagement/disengagement mechanism that makes it possible for the user to accomplish disengagement by a single motion.

A further objective of the present invention is to provide a computer accessory engagement/disengagement mechanism that allows the user to engage/disengage the accessory with ease.

In accordance with the present invention, a mechanism is provided which is capable of releasing the engagement means at a stroke so that the user need take no extra effort. The engagement/disengagement mechanism includes a disengagement member having a pushing part for the user to push on and an engagement member having an retaining element provided on the accessory and an engagement bar provided on the casing of the computer which can be elastically pivoted for engagement with said retaining element. The disengagement member further includes elastic means such as a spiral spring for restoring the pushing part to its original position after being pushed and a lug. The engagement member is fixed on a plastic board by means of screws and the engagement bar, used for hook-up engagement with the accessory, is elastically pivoted with help of an urging part provided thereon. The engagement bar further includes an outwardly oblique protrusion corresponding to an oblique portion provided on the disengagement member such that when the user pushes the pushing part to cause it to travel in the direction towards the user, the oblique portion will come into contact with the corresponding oblique protrusion and thus will cause the engagement bar to be lifted so as to release the engagement with the accessory. Moreover, the pushing lug, in the process of travelling in the direction towards the user of the disengagement member, will come into contact with the accessory which is now released from the engagement element and push it out of the computer.

To engage the accessory to the socket of the notebook computer, the user just needs to insert the accessory into the socket and then push the accessory all the way in so that the accessory will be engaged by a hook provided on one end of the engagement bar of the mechanism. To release the engagement, the user just needs to push the pushing part all the way to its end and the engagement bar will be lifted so that the accessory will be released and, in the meantime, the pushing lug will push the accessory out of the notebook computer.

The above and further objects and novel features of the present invention will be more fully apparent from the following detailed description when the same is read in conjunction with the accompanying drawings.

BRIEF DESCRIPTION OF THE INVENTION

DETAILED DESCRIPTION OF THE INVENTION

Figure 1:
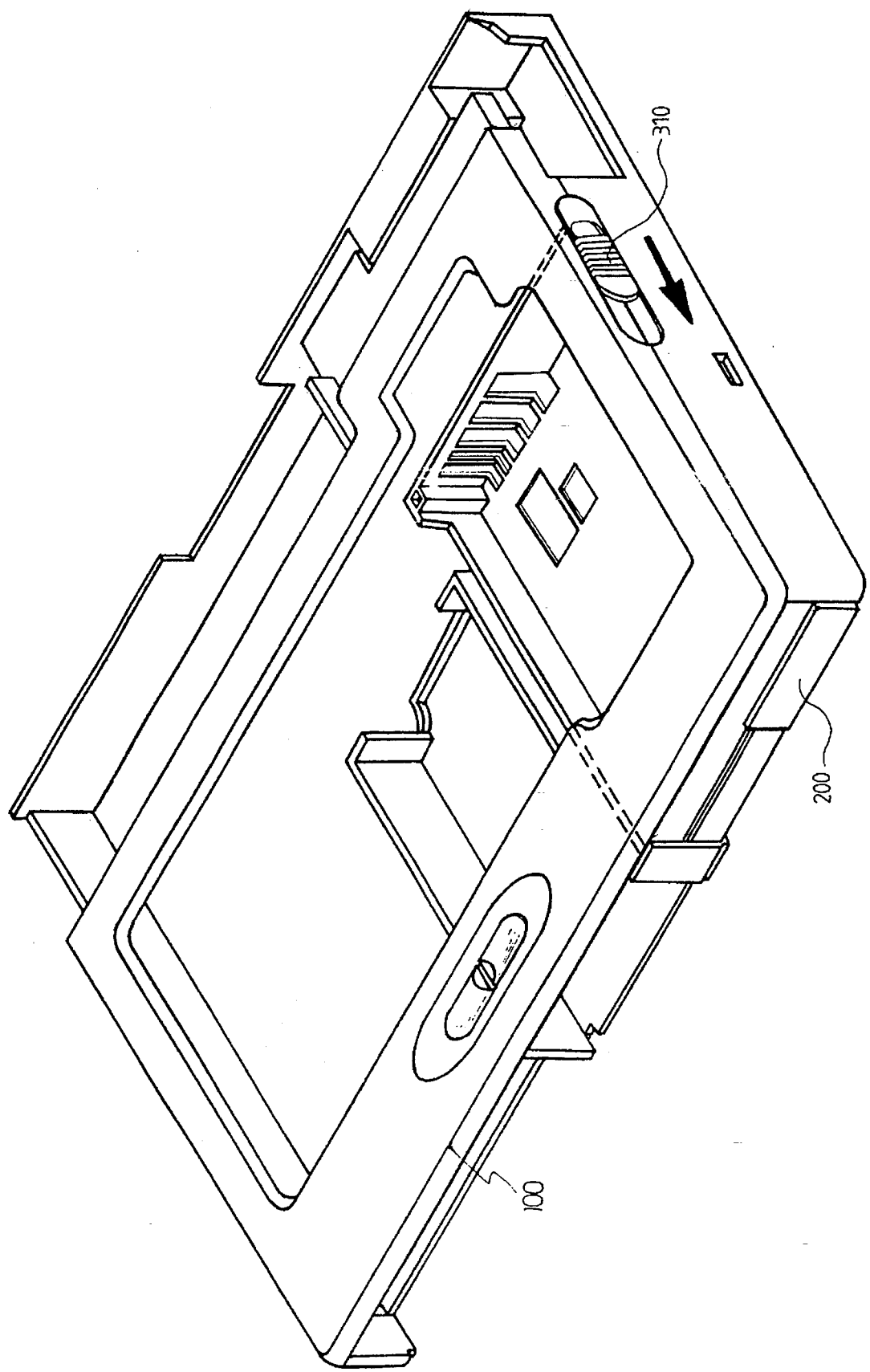
FIG. 1 is a front view of an embodiment of a notebook computer provided with an engagement/disengagement mechanism of the present invention.

FIG. 1 shows a notebook computer 100 having an accessory 200 and provided with an engagement/disengagement mechanism embodying to the present invention. It is to be understood that the engagement/disengagement mechanism according to the present invention can be applied to any types of accessories of the notebook computer such as batteries, CD-ROMs, hard disk drives, floppy disk drives, etc. Generally, the engagement/disengagement mechanism is provided on a notebook computer for the hook-up engagement and disengagement between the notebook computer and the accessory.

Figure 2:
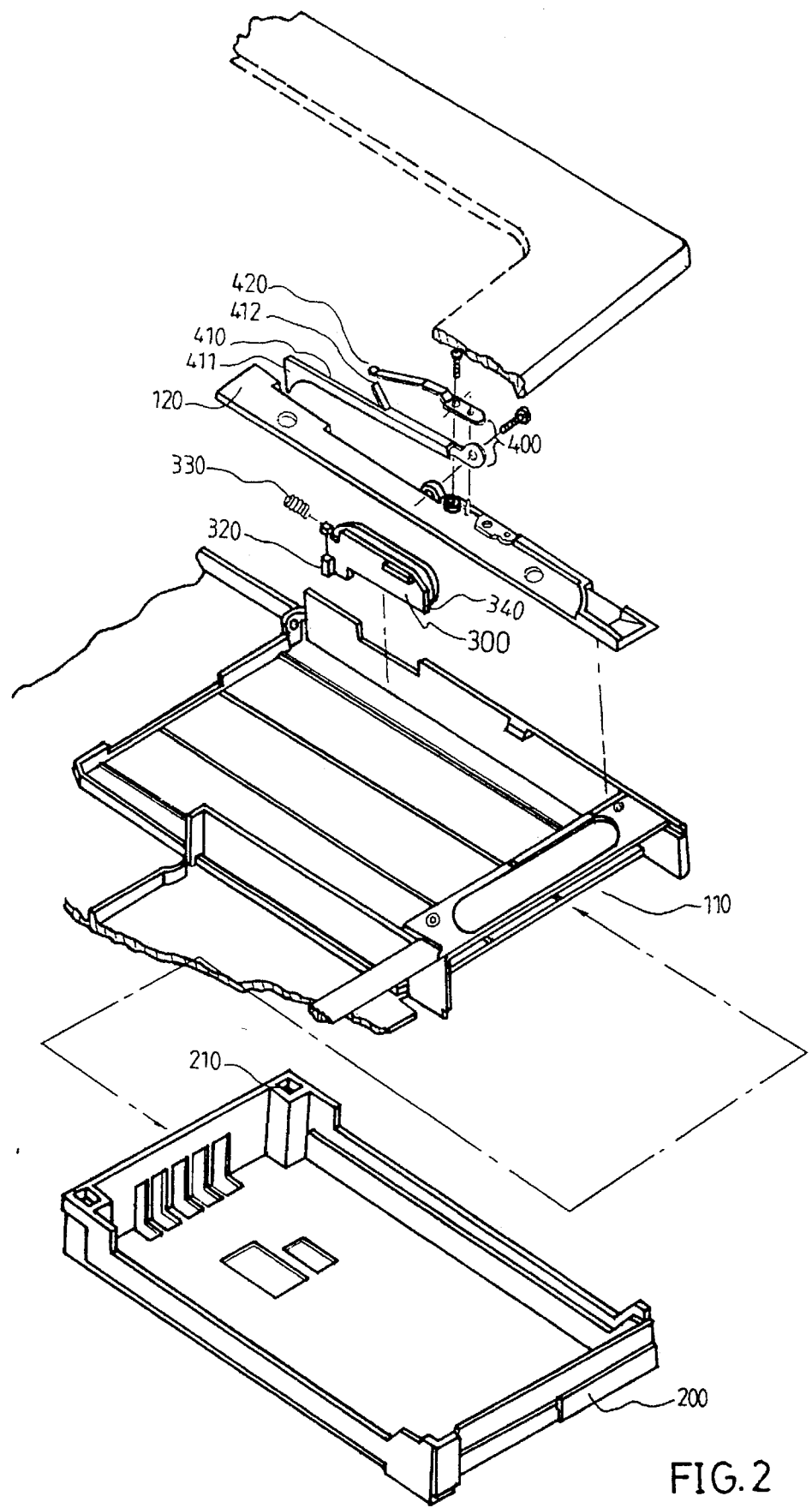
FIG. 2 is an exploded perspective view of an embodiment of a notebook computer provided with an engagement/disengagement mechanism of the present invention showing all constituent parts.

The accessory 200 is provided with a multiple-pin connector (not shown) which is to be connected to a connector (not shown) in the notebook computer 100 for data communication between the two. Referring to FIG. 2 in connection with FIG. 3A–3B, an engagement bar 410, having one end fixed to the casing of the computer and the other provided with a hook 411, is provided on the engagement/disengagement mechanism for the hook-up engagement with the accessory 200. The engagement can be made simply by inserting the accessory 200 all the way into the end and the hook 411 will be engaged with the retaining element such as a recess 210 provided on an upper corner of the accessory 200. This also couples the connector with its corresponding connector of the notebook computer 100. To withdraw the accessory 200 out of the notebook computer 100, the user just need to push the pushing part 310 of the disengagement member 300. During such course of action, the hook 411 will be lifted so that the engagement is released and the accessory 200 will be pushed out by a lug 320.

Figure 3A:
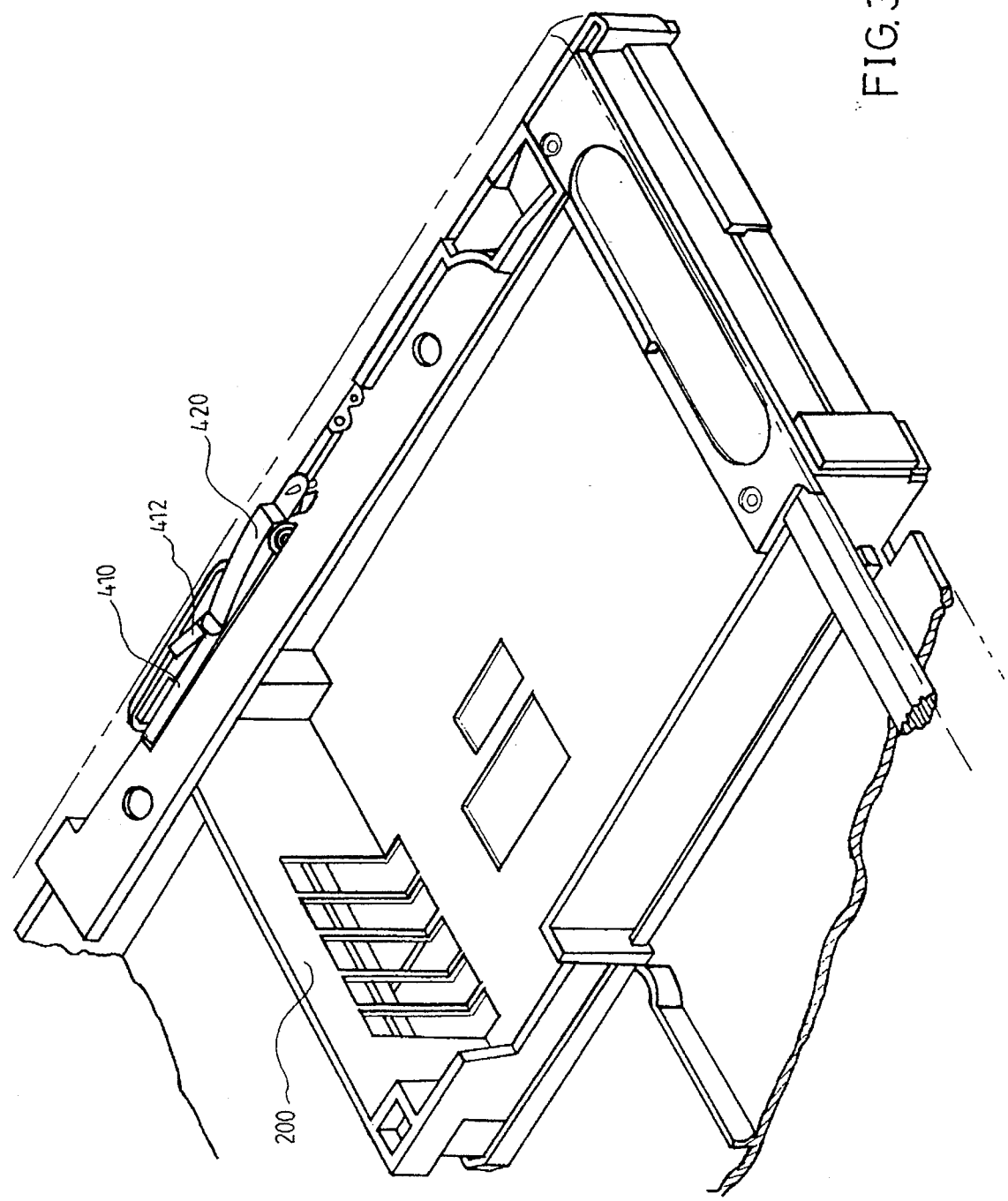
FIG. 3A and 3B are a perspective view and a cross-sectional view of the present invention showing the first stage of the disengaging process during which the engagement bar is lifted.
Figure 3B:
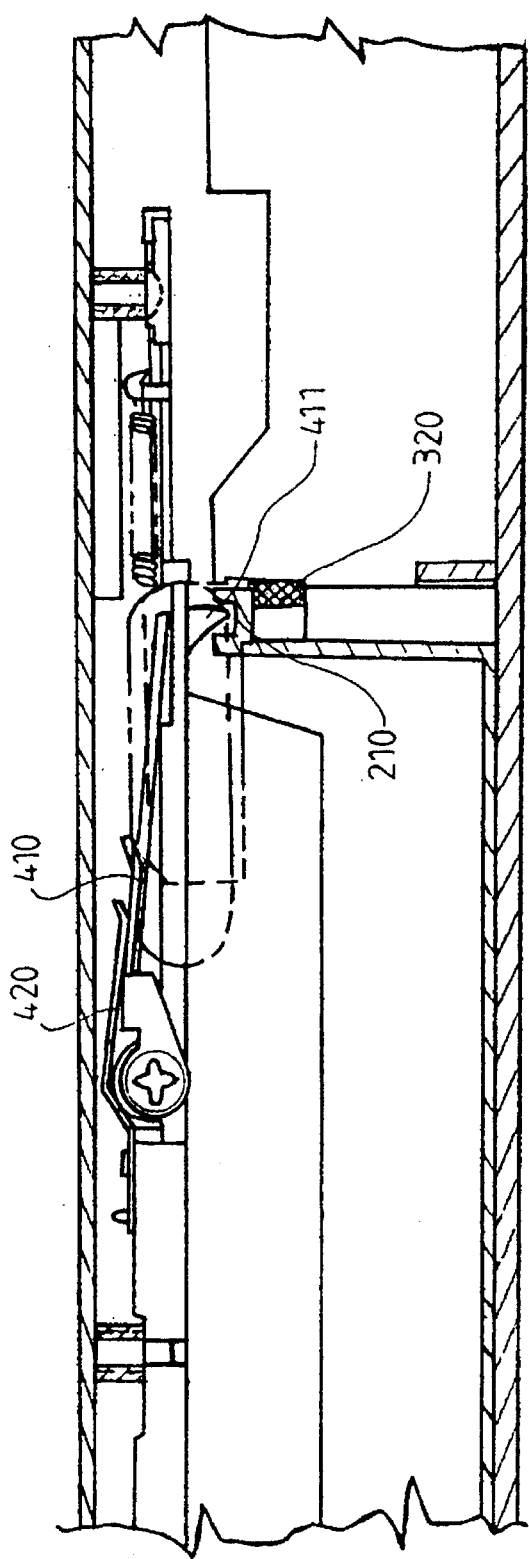
Figure 4A:
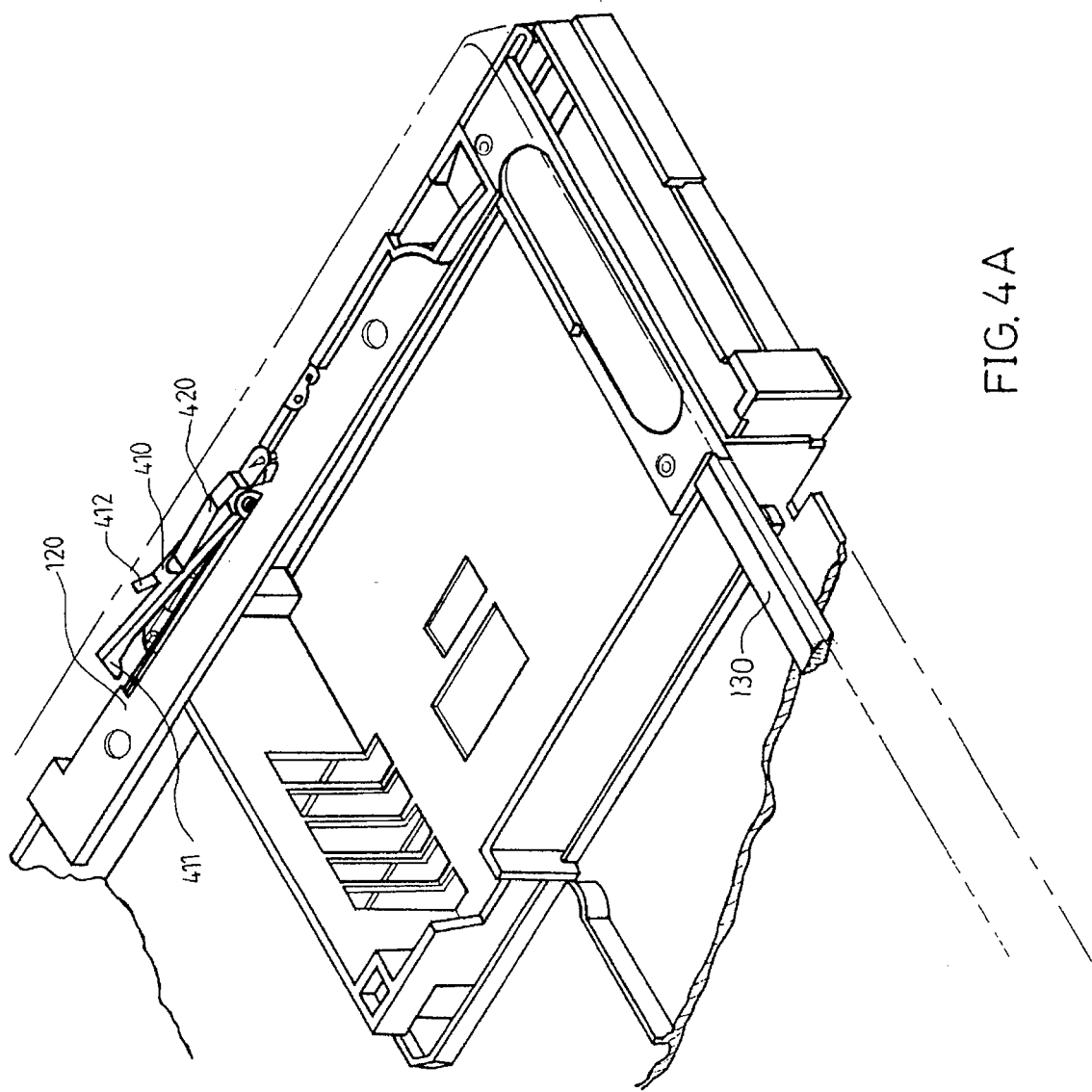
FIG. 4A and 4B are a perspective view and a cross-sectional view of the present invention showing the second stage of the disengaging process during which the lug pushes the accessory.

Referring to FIG. 2, the engagement/disengagement mechanism comprises an engagement member 400 which includes an engagement bar 410 and an urging part 420 provided thereon by means of screws, and a disengagement member 300 which includes a pushing part 310, a pushing lug 320 provided on the disengagement member 300 and an elastic means 330 such as a spiral spring. The disengagement member 300 is embodied as a gliding member gliding back and forth on the casing of the notebook computer 100. As shown in FIG. 3A–3B in connection with FIG. 2, the accessory 200 is in an engaged status during which the engagement bar 410 is engaged with the retaining element 210 so that the accessory 200 is secured in the socket 110 of the notebook computer 100. FIG. 4A shows a second stage of the disengagement during which the pushing lug 320 pushes the accessory 200 out of the notebook computer 100.

Figure 4B:
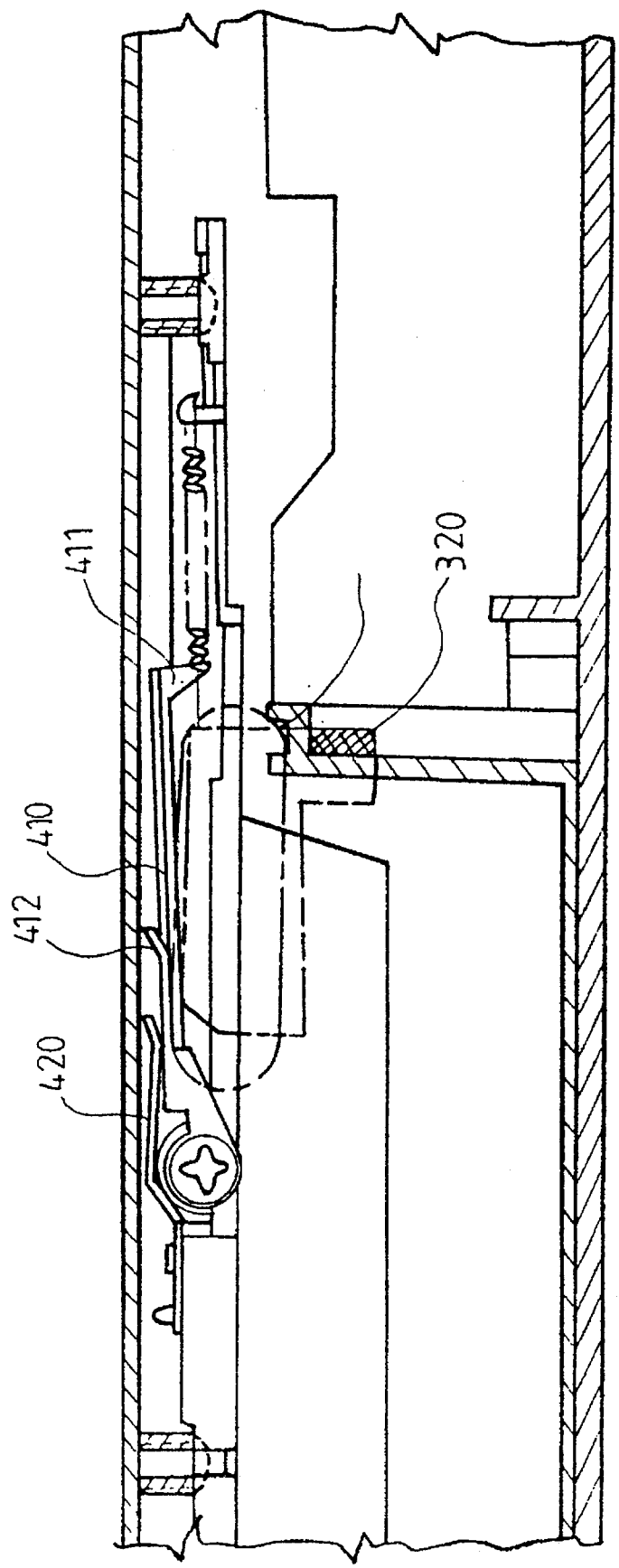
Figure 5:
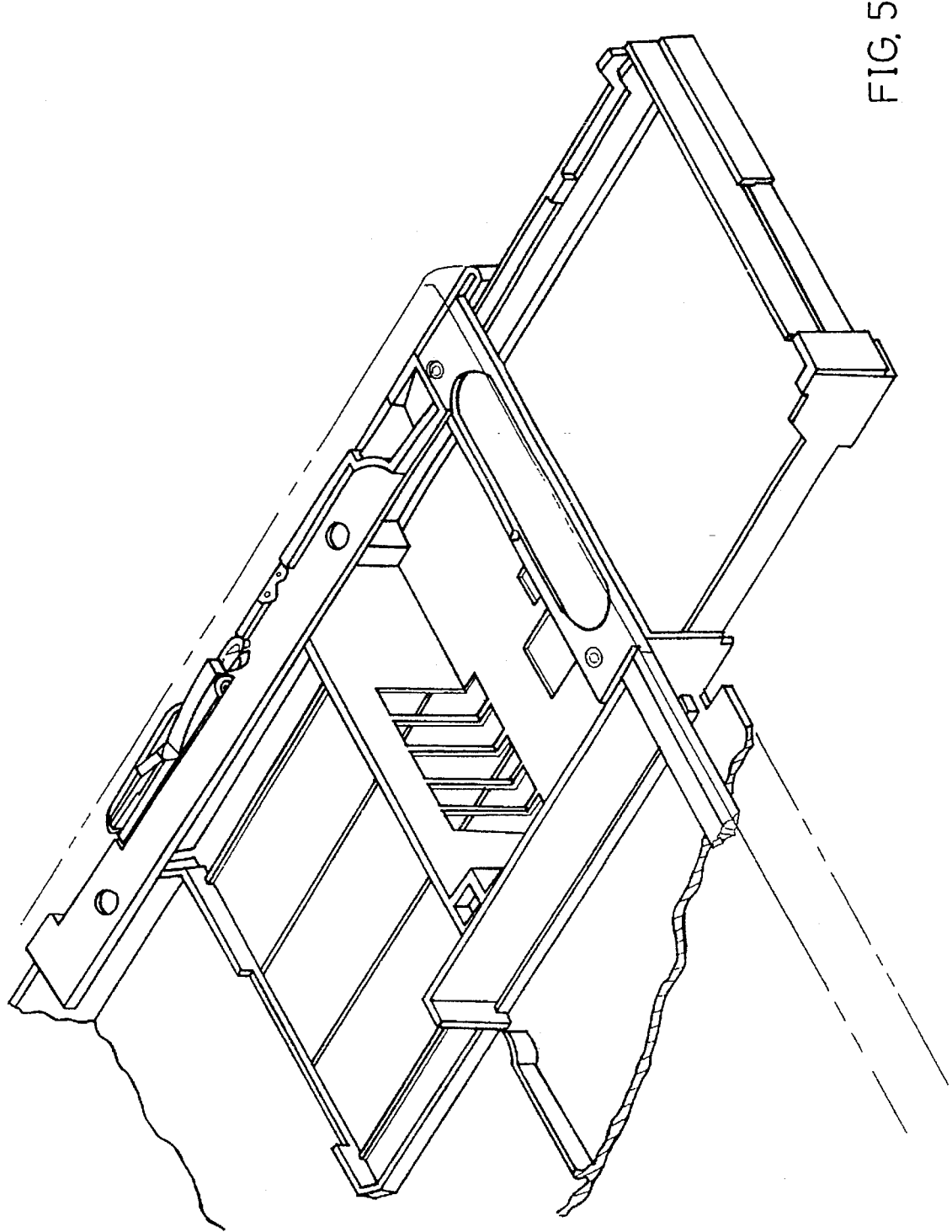
FIG. 5 is a perspective view of an embodiment of a notebook computer provided with an engagement/disengagement mechanism of the present invention with the accessory being pulled out of the notebook computer.

Moreover, as shown in FIG. 2 in connection with FIG. 4A–4B, the urging part 420 of the engagement member 400 provided on a plastic board 120 fixed to the casing 130 of the notebook computer 100 is provided on the engagement bar 410 in such a way that it always urges said engagement bar 410 so that it will be elastically engaged with the retaining element 210 provided on the accessory 200. Referring to FIG. 2, the engagement bar 410 is further provided with an oblique protrusion 412 which corresponds to an oblique portion 340 provided on said engagement member 300.

Engaging the Accessory

To attach the accessory 200 to the notebook computer 100 the user just need to insert the accessory 200 into the socket and push the accessory all the way into the notebook computer 100. When the accessory 200, during the insertion, contacts the hook 411, the engagement bar 410 will be forced to move upwards so that the hook 411 will not get in the way and, in the meantime, the accessory 200 could go a bit further to the end. Thereafter, the hook is inserted in the retaining element 210 and the accessory 200 is thus engaged with the notebook computer 100.

Disengaging the Accessory

To detach the accessory 200 from the notebook computer 100, the user just needs to push the pushing part 310 of the disengagement member 300 and then pull the accessory outwards to make the detachment. In the first stage of the disengagement as shown in FIG. 3A–3B, the engagement member 300 is pushed to move towards the direction of the user whereupon the oblique portion 340 of the disengagement member 300 will come into contact with the oblique protrusion 412 of the engagement bar 410 so that the engagement bar 410, along with the hook 411, will be actuated to lift up, making the release of engagement of the hook 411 with the retaining element 210 of the accessory 200.

During the second stage of the disengagement, as shown in FIG. 4A–4B, the pushing lug 320 of the disengagement member 300, while the hook 411 being released from the engagement, will contact with the accessory 200 with the advance of the disengagement member 300. Therefore, the accessory 200 will be pushed out of the notebook computer 100 a bit so that it will be more convenient for the user to pull the accessory out of the notebook computer 100.

While an embodiment of the invention has been shown and described above, the invention is not limited to the specific construction of this described embodiment, since this embodiment described is merely exemplary rather than defined or limited.

I claim:

1. In combination with a computer housing, a mechanism for releasably securing an accessory, having a retaining element such as a recess, within the computer housing, said mechanism comprising a latch arm pivotally connected to the housing, for engaging the retaining element, said latch arm being movable between a latched position in which the arm interengages with said retaining element and a release position in which the arm is free of said retaining element, first biasing means for urging said arm toward said latched position, an oblique element protruding from said latch arm for moving said element toward said release position, a disengagement member, supported by the housing, and being movable between a rest position and an active position, spring means for urging said disengagement member toward said rest position, said disengagement member having a portion which can be manipulated from outside the housing so as to move the disengagement member toward its active position, said disengagement member having a surface which bears against said oblique element as the disengagement member is moved toward said active position, to free said arm from said element, and said disengagement member further having a lug for ejecting the accessory partially from the housing.

2. The invention of claim 1, wherein the latch has two ends: one pivotally connected to the housing, and the other provided with a hook for engaging said retaining element.

3. The invention of claim 1, wherein said disengagement member is a slidable member mounted for sliding movement in an opening in said housing.

* * * * *